United States Patent [15] 3,699,518

Greenough et al. [45] Oct. 17, 1972

[54] METHOD AND MACHINE FOR READING HANDWRITTEN CURSIVE CHARACTERS

[72] Inventors: Maurice Leighton Greenough; Milton L. Kuder, both of Rockville, Md.

[73] Assignee: The United States of America as represented by the Secretary of Commerce

[22] Filed: Jan. 18, 1971

[21] Appl. No.: 107,324

[52] U.S. Cl........340/146.3 Z, 235/61.11 E, 283/1 R, 283/45, 340/146.3 A

[51] Int. Cl.................................................G06k 9/18

[58] Field of Search...340/146.3 A, 146.3 Z; 283/45, 283/18, 1 R, 9 R; 35/36, 37; 178/18; 250/219 CR; 235/61.11 E

[56] References Cited

UNITED STATES PATENTS

| | | | |
|---|---|---|---|
| 3,108,254 | 10/1963 | Dimond | 340/146.3 Z |
| 2,963,220 | 12/1960 | Kosten et al. | 340/146.3 A |
| 2,964,734 | 12/1960 | West | 340/146.3 Z |
| 3,058,093 | 10/1962 | Vernon et al. | 340/146.3 Z |
| 3,485,168 | 12/1969 | Martinson | 340/146.3 Z |

*Primary Examiner*—Maynard R. Wilbur
*Assistant Examiner*—Leo H. Boudreau
*Attorney*—David Robbins and Alvin J. Englert

[57] ABSTRACT

A machine for reading alphanumeric characters handwritten within preprinted guides. The guides position eight strokes (leading strokes, body strokes, head strokes, etc.) used in forming cursive characters. The machine scans the guides in sequence, producing for each guide an eight-bit code corresponding to the strokes formed in it. The eight-bit codes are converted to standard machine codes. In a detailed embodiment, the guides are serially printed on a paper tape and the machine includes a tape advance mechanism, a tape lateral shift mechanism, a light for illuminating the guide being scanned, and an array of photocells for producing the eight-bit code as the tape is advanced and shifted over the photocells. The machine also includes a program controller, memory, and code converter.

2 Claims, 10 Drawing Figures

INVENTORS

M.L. Greenough
M.L. Kuder

BY Alan Englert

AGENT

METHOD AND MACHINE FOR READING HANDWRITTEN CURSIVE CHARACTERS

BACKGROUND OF THE INVENTION

Handwritten character reading machines permit one to enter information into computers without using keyboard equipment. Prior machines typically are based on the use of Roman capitals (A,B,C,...) and Arabic numerals (0,1,2,3,...) formed about simple guides, such as a pair of vertical dots. The problems encountered in distinguishing between similar characters, for example between A and R or between B and 8, are difficult to resolve, and require complex, expensive machinery. The problems are aggravated when the character set is expanded to include the full alphanumeric set of alphabetic, numeric, punctuation, mathematic, and machine-control characters.

SUMMARY OF THE INVENTION

This invention simplifies the design difficulties of the prior machines by using cursive rather than Roman capital characters. Besides being easier and faster to write than the capitals, the cursive forms have a large number of characteristic strokes that can be used to distinguish between similar characters. This invention uses eight strokes: body strokes, head strokes, tail strokes, upper and lower leading strokes, upper and lower trailing strokes, and underlining strokes. These eight strokes can form $2^8$ or 256 combinations. The invention modifies the alphanumeric cursive characters from their normal forms so that their strokes define a unique combination or code for each character, whether alphabetic, numeric, punctuation, mathematic, or machine control. The invention provides preprinted guides that assist the writer in positioning the character strokes. And finally, the invention provides a relatively simple and inexpensive machine for scanning the preprinted guides and generating the codes that correspond to the characters written in them.

DETAILED DESCRIPTION OF THE INVENTION

Figure 1:
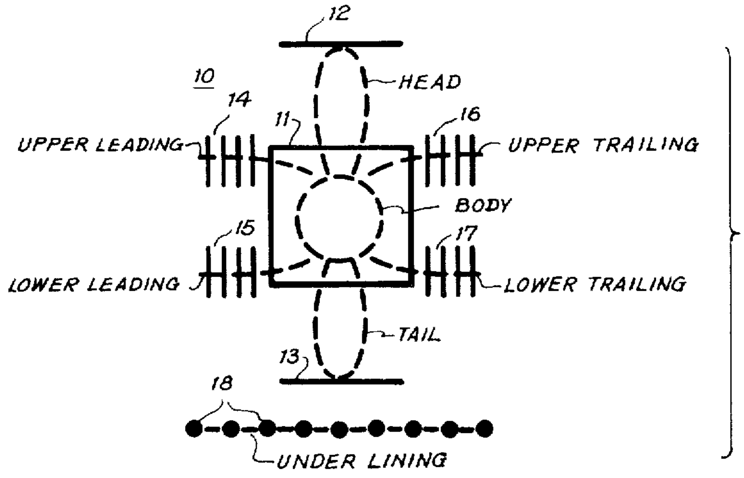
FIG. 1 shows a preprinted guide, designed according to this invention, that accurately positions eight strokes of cursive characters.

The preprinted guide 10 of FIG. 1 consists of a box 11, two horizontal lines 12 and 13 placed above and below the box, four sets of vertical lines 14, 15, 16, 17 placed at the sides of the box, one set near each corner, and a horizontal row of dots 18 placed below the line 13. When using the guide, the writer draws the upper or lower leading stroke of a character through lines 14 or 15, draws the body strokes (or loops) in box 11, draws the head strokes up to line 12, and draws the tail strokes down to line 13. He draws the upper or lower trailing stroke through lines 16 or 17, and any underlining stroke through dots 18.

The eight parts 11–18 of guide 10 thus position eight strokes. These parts could of course be modified, as by replacing box 11 with a circle, or by replacing lines 12 and 13 with large dots (not shown). Box 11 is preferred because its corners guide the writer in drawing leading and trailing strokes to and from the body strokes. The two horizontal lines 12, 13 allow the writer to slant and to broaden the head and tail strokes, requiring only that he touch the lines at some point. The four sets of vertical lines 14–17 encourage the writer to draw leading and trailing strokes horizontally and at fixed heights with respect to the base line of the character—the bottom line of box 11. This is important because most writers form these strokes with little attention. The dots 18 help the writer draw an underlining stroke of prescribed length and at a prescribed distance below the character tail stroke.

Figure 2:
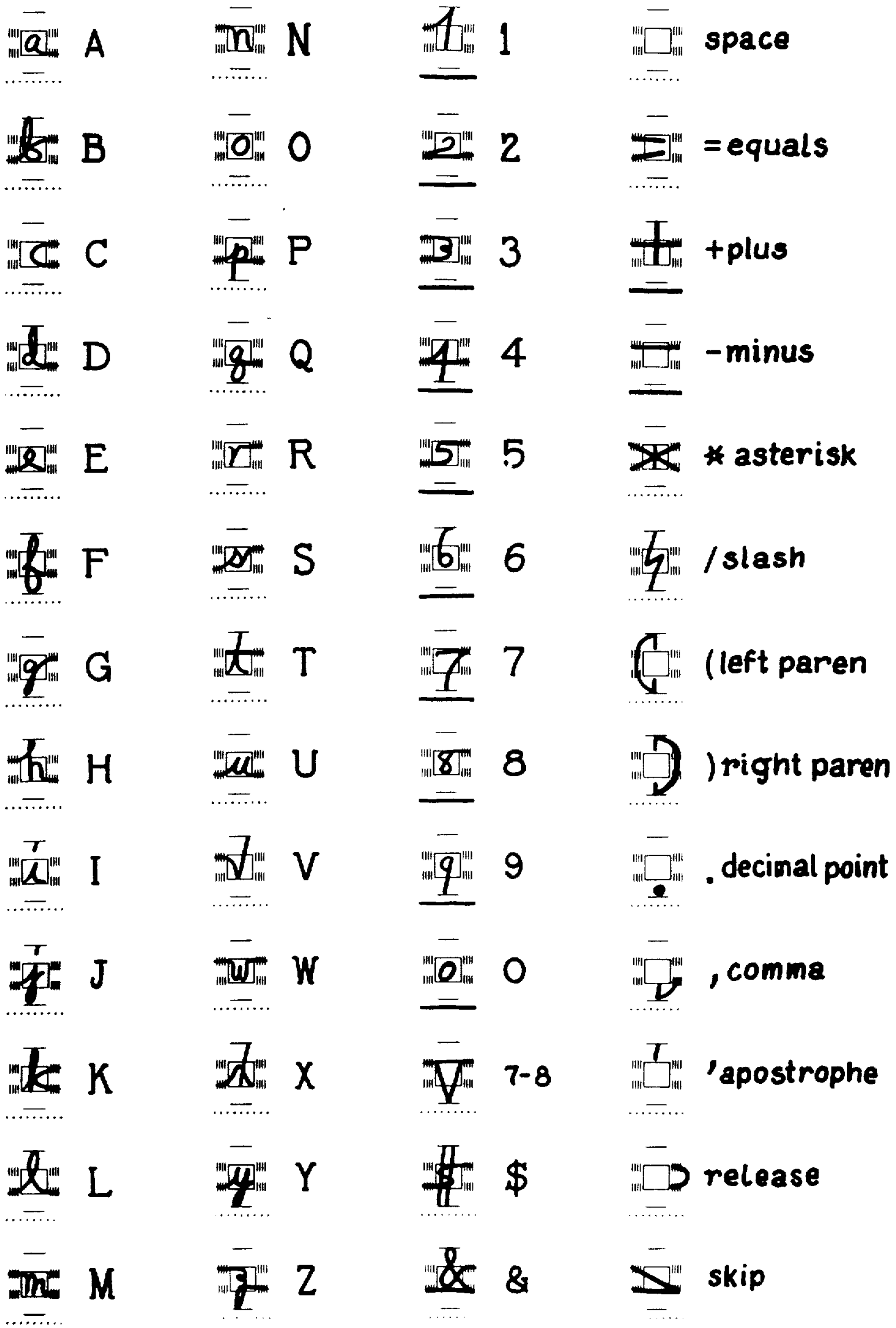
FIG. 2 shows a cursive alphanumeric character set designed according to this invention.

FIG. 2 shows a set of cursive characters formed within preprinted guides. The *a* has a body stroke (more precisely, a loop and a downstroke) and a lower trailing stroke. The *b* has a lower leading stroke, body stroke, head stroke, and upper trailing stroke. The *c* has a body stroke and both upper and lower trailing strokes. From these examples, the reader will be able to identify the strokes used to form the remaining alphabetic characters.

Besides using leading, body, head, tail and trailing strokes, all numerals use the underlining stroke. The 7–8 is a special machine character, as are release and skip. The strokes of these characters and of the mathematic symbols (=, +, −...) and of the punctuation (parentheses, comma, apostrophe...) may be identified by the reader.

If the reader wishes, he may verify by inspection that each character of FIG. 2 has a unique combination (code) of strokes. (He may wish to construct a table of eight stroke columns and 52 character rows and to enter 1's and 0's in the column-row intersections, a 1 indicating that the character of that row has the stroke of that column, a 0 indicating the character does not have the stroke.) Since the 52 characters use less than one-fourth of the 256 available combinations of eight strokes, it has been possible to design the set so that each character largely uses "normal" strokes and yet uses a unique combination of strokes. Naturally the less the characters are modified from their normal forms, the easier it is for the writer to memorize and use the system.

Figure 3:
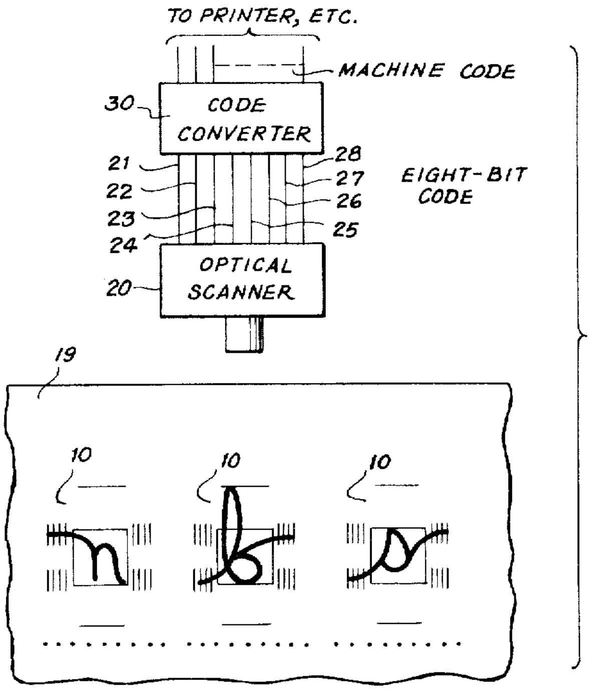
FIG. 3 is a semi-diagrammatic view of a machine for reading the cursive characters of this invention.

FIG. 3 shows a machine for reading characters formed in guides 10 preprinted on a surface 19. It includes an optical scanner 20 which scans the guides in sequence and which produces for each guide an eight-bit code corresponding to the stroke code of the character in it. For example, after the *n* is scanned, scanner 20 has the following signals on its eight output lines 21–28:

| Line | Signal | Stroke |
|---|---|---|
| 21 | 1 | body |
| 22 | 0 | head |
| 23 | 0 | tail |
| 24 | 1 | upper leading |
| 25 | 0 | lower leading |
| 26 | 0 | upper trailing |
| 27 | 0 | lower trailing |
| 28 | 0 | underlining |

The eight-bit code for *n* is thus 10010000. After the *b* is scanned, the output code is 11001100 (which means: body stroke, head stroke, no tail stroke, no upper leading stroke, lower leading stroke, upper trailing stroke, no lower trailing stroke, no underlining stroke). And similarly the code for *s* is 10001100.

Since the eight-bit codes are specific to this invention, they are converted by a code converter 30 to a machine code which is then used to drive a printer or card punch or other recording device.

Figure 4:
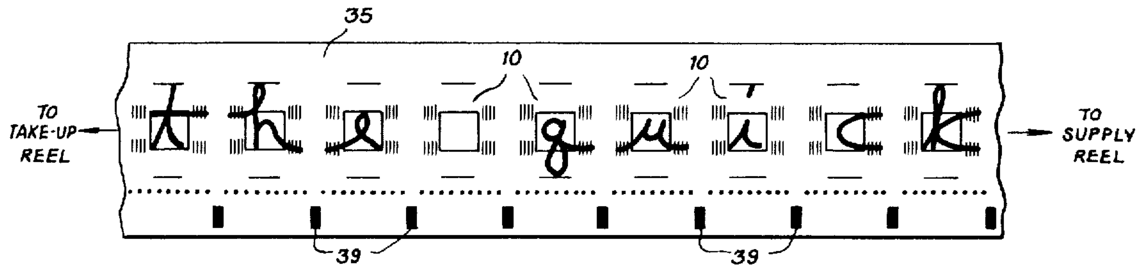
FIG. 4 is a plan view of a paper tape serially printed with guides according to this invention.

FIG. 4 shows a 1 inch paper tape 35 preprinted with guides 10. They are printed serially, conveniently with a reference space (not shown) after every 10, 20, or so guides. From a supply reel of the tape, the writer draws off a length and writes the characters of his message in strung-out fashion, winding the completed part on a take-up reel if the message is long. The message can take a variety of forms, such as a computer program, scientific data, or a business letter.

On paper tape 35 each guide 10 includes a ninth part, a short, heavy vertical line 39 placed to the right and below the row of dots 18. The purpose of line 39 is to enable a scanner to stop the tape and examine the strokes in a guide.

Figure 5:
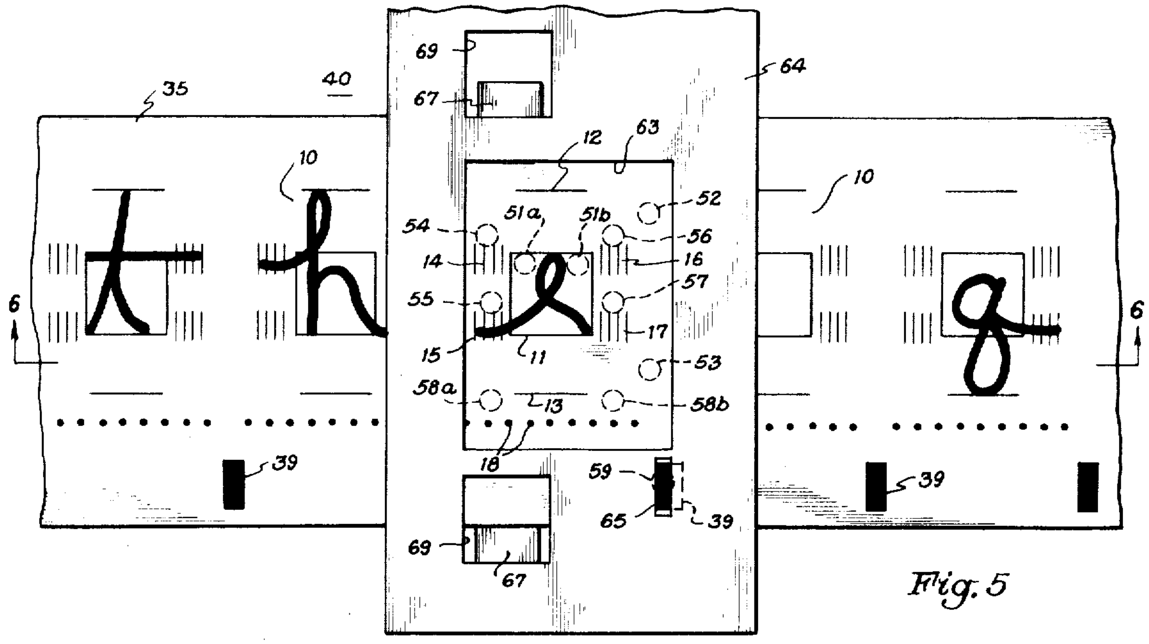
FIG. 5 is a plan view of a portion of a machine for reading cursive characters written on the paper tape of this invention.
Figure 6:
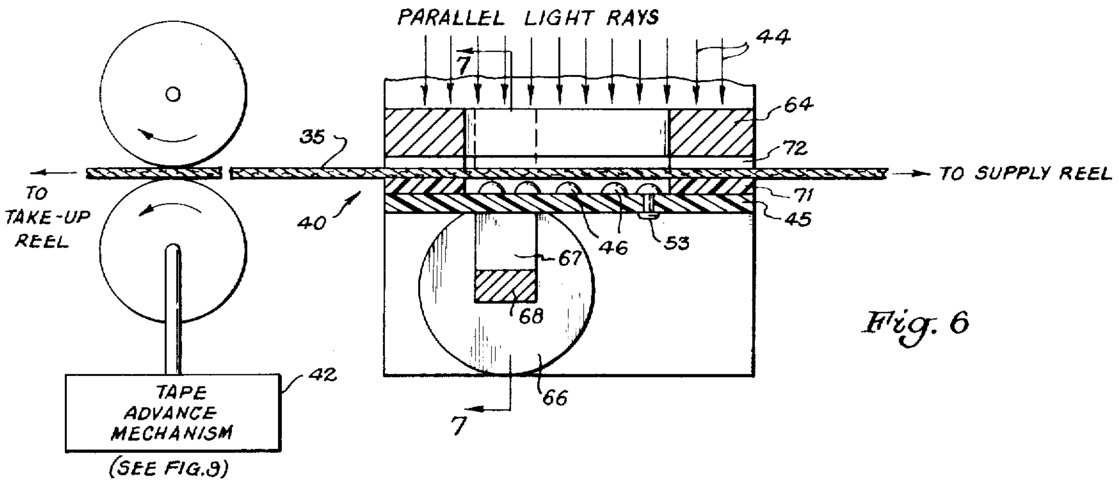
FIG. 6 is a cross-sectional view taken on line 6—6 of FIG. 5.
Figure 7:
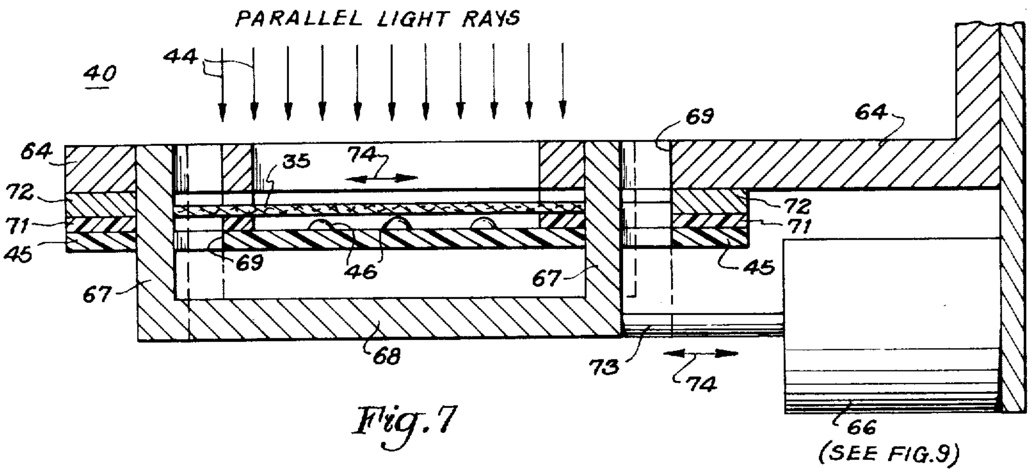
FIG. 7 is a cross-sectional view taken on line 7—7 of FIG. 6.

FIGS. 5–10 show a machine for reading the characters written on paper tape 35. As shown in FIG. 6, the tape, carried on a supply reel, is advanced through an optical scanner 40 by an advancing mechanism 42 and is wound onto a take-up reel. In scanner 40 the tape is illuminated by a beam of parallel light rays 44. Since the paper tape, like ordinary writing paper, is translucent, some of the rays pass through it. These transmitted rays impinge on a planar array of eleven miniature, semiconductor-type photocells. Mounted on a printed-circuit board 45 with their built-in collecting lenses 46 projecting above it (FIG. 6), the photocells are arranged in nine groups in order to scan the nine parts of a guide 10 (FIG. 5). The nine groups are as follows:

| Photocells | Guide Part Scanned | Strokes Detected |
|---|---|---|
| 1) 51*a*, 51*b* | 11 | body |
| 2) 52 | 12 | head |
| 3) 53 | 13 | tail |
| 4) 54 | 14 | upper leading |
| 5) 55 | 15 | lower leading |
| 6) 56 | 16 | upper trailing |
| 7) 57 | 17 | lower trailing |
| 8) 58*a*, 58*b* | 18 | underlining |
| 9) 59 | 39 (stop-tape line) | — |

Although the guides 10 naturally are visible to the writer, their stroke-positioning parts 11–18 are invisible to their photocells **51*a*–58*b*. If these photocells are, for example, silicon-type, they will "see" (respond to) only the red part of the spectrum. Then if parts 11–18** of the guide marks are printed in red ink, which freely passes red components, the photocells will not see the printings. Of course, the photocells will see any handwritten strokes made in these parts with opaque pencil lead or with opaque ink, as from a felt-tip pen. Normally the strokes are about as wide as the diameters of the photocell lenses (1/32 inch); in passing over the lenses they greatly block the light, causing momentary dips in the photocell output signals.

On the other hand, the stop lines 39 of the guides 10 are visible to photocell 59. If the photocell is a red responsive silicon type, lines 39 are printed in a red-absorbing ink such as blue or black. Passed over the photocell, these dark lines prevent the red components from reaching the photocell. Conversely, if photocell 59 is a blue responsive device such as a photomultiplier tube, the lines 39 are then printed in red. In the latter case, the printing of the paper tape is done simply in the one color, red.

Figure 9:
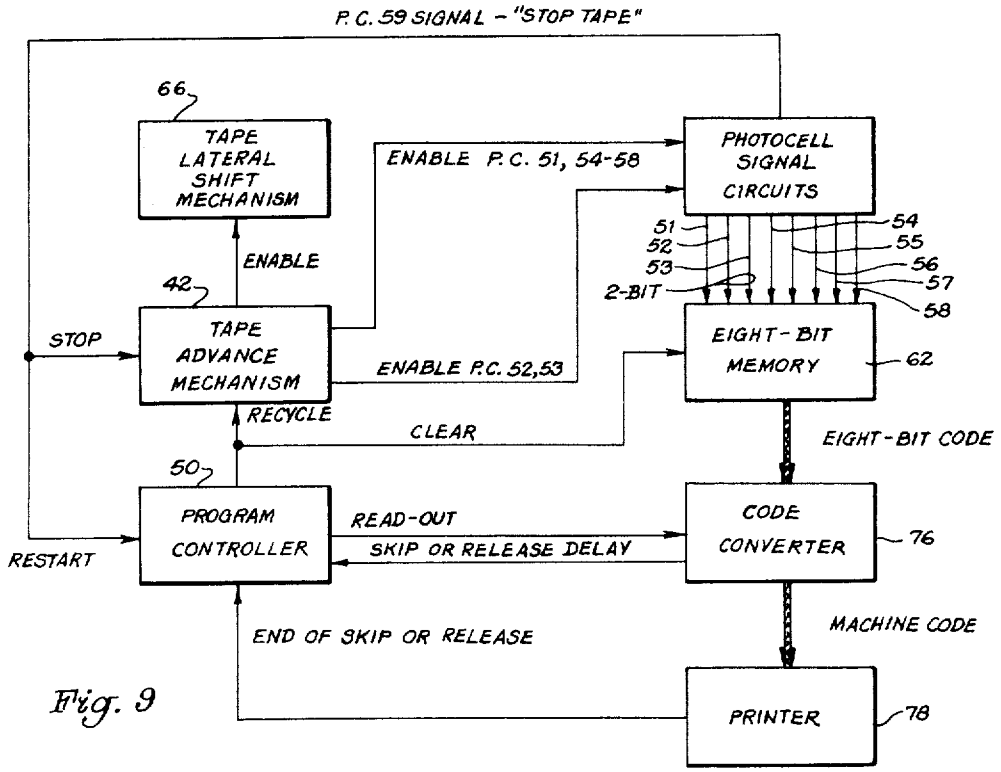
FIG. 9 is a block diagram of the machine shown in FIGS. 5–8.
Figure 10:
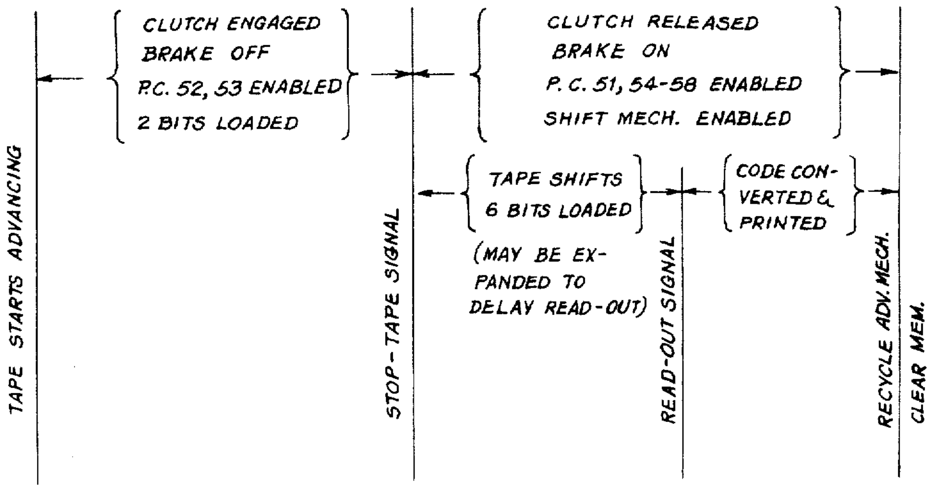
FIG. 10 is a timing chart for use with the block diagram of FIG. 9.

As shown in FIGS. 9 and 10, the machine includes a program controller 50 which initiates a cycle by applying a pulse to recycle the tape advance mechanism 42 and to clear an eight-bit memory 62. The program controller consists of two cascaded monostable multivibrators (not shown); the cycle-initiating pulse is provided by the trailing edge of the second multivibrator, after which the cascade waits asynchronously for a restart signal.

In tape advance mechanism 42, the recycle pulse is applied to a bistable multivibrator (not shown), which then energizes the tape drive and enables photocell circuits 52, 53. Energizing the tape drive is accomplished in the well-known manner by engaging a clutch (not shown) between the drive motor and tape rollers and simultaneously releasing a brake (not shown) on the rollers.

As shown in FIG. 5, the enabled photocells 52, 53 are located near the right edge of window 63 in scanner top plate 64. Hence any head strokes or tail strokes formed in a guide (assumed entering the window) will interrupt the light impinging on the photocells, by the time the guide is fully advanced to the position shown in the figure. For example, as the *t* enters window 63 from right to left, the output of photocell 52 momentarily decreases as the head stroke blocks the light, while the output of photocell 53 remains constant since there is nc tail stroke. The photocells 52, 53 thus generate the two-bit code 10. The two-bit code (head stroke, tail stroke) for *h* would be 10, for *e*, 00. For a character with both head and tail strokes, like *f*, the code would of course be 11. As shown in FIGS. 9 and 10, the two-bit code generated during the advance of a guide is loaded into the eight-bit memory 62.

When paper tape 35 is fully advanced as shown in FIG. 5, stop-tape line 39 of the guide interrupts the light to photocell 59. In order to sharpen the onset of the light interruption, scanner top plate 64 overlies photocell 59 and is slitted at 65 to pass a narrow beam of light to the photocell. Consequently the output of the photocell quickly drops when the leading edge of stop line 39 moves into the narrow beam. As shown in FIG. 9, this abrupt signal from photocell 59 is used to stop the tape advance mechanism 42 and restart the program controller 50.

In the advancing mechanism 42, the stop signal changes the state of the bistable multivibrator (not shown), causing the clutch between the motor and tape to be released and the brake on the roller shafts to be applied. This causes the paper tape to be precisely stopped in the position shown in FIG. 5. As shown in FIGS. 9 and 10, when the multivibrator changes state, it also disables the photocells 52 and 53, and enables tape lateral shift mechanism 66 and the remaining photocells 51, 54–58.

Figure 8:
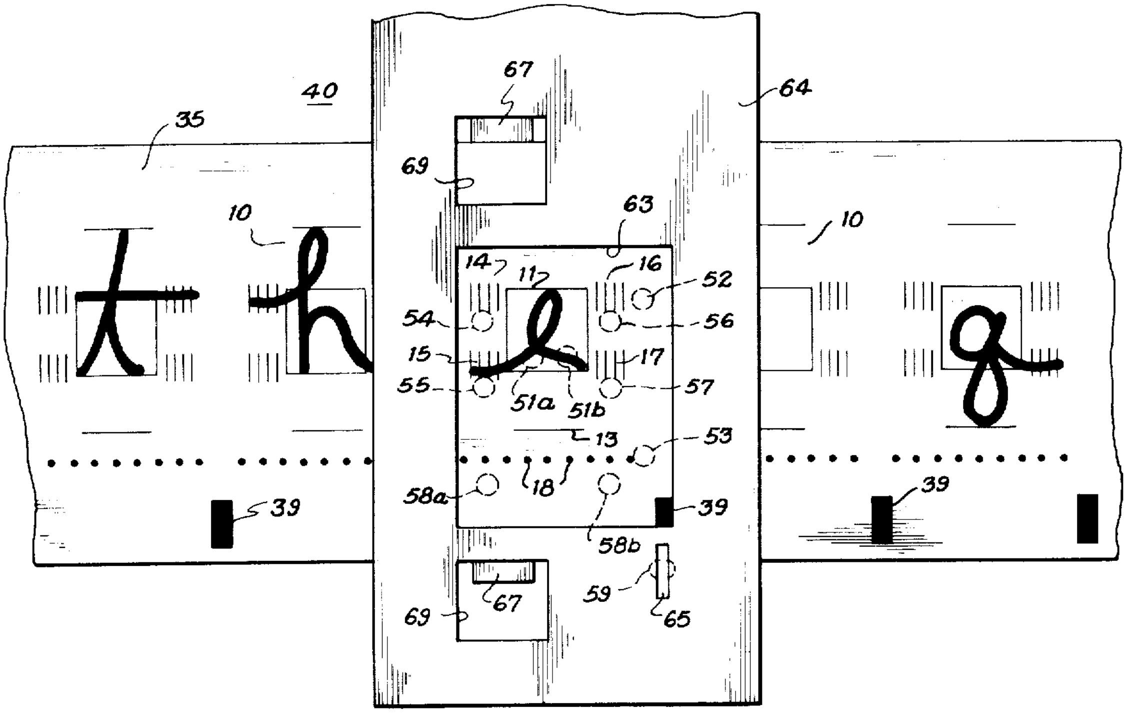
FIG. 8 is a plan view similar to FIG. 5, showing the paper tape in the laterally shifted position.

When enabled, the shift mechanism 66 shifts paper tape 35 laterally from the position shown in FIG. 5 to that shown in FIG. 8, and back to the FIG. 5 position. This pulse action can be achieved in any well-known manner, as by using the enable signal to switch a charged condenser (not shown) across a solenoid that laterally moves the tape. In this arrangement, shown in further detail in FIG. 7, tape 35 is laterally positioned in the scanner 40 by a U-shaped guide 68 whose arms 67 extend through two openings 69 formed in the four plates of the scanner. The top of the four plates is the scanner top plate 64, shown in FIGS. 5 and 8; the bottom plate is printed-circuit board 45 which carries the 11 miniature photocells. Plate 71, mounted on circuit board 45, insulates the printed conductors (not shown) and supports the moving paper tape 35, preventing it from abrading the raised lenses 46 of the photocells. Mounted between insulating plate 71 and top plate 64, shim plate 72 provides vertical clearance for the tape in the scanner 40. Since U-shaped guide 68 is connected to armature 73 of the shifting mechanism 66, pulsing of the mechanism laterally shifts the paper tape 35 as indicated by arrows 74.

As paper tape 35 is shifted, box 11 of guide 10 moves across photocells 51*a* and 51*b*, which are electrically connected in parallel, causing any handwritten body strokes in the box to interrupt the light to the photocells. For instance, as the *e* is shifted from the position shown in FIG. 5 to that shown in FIG. 8, the sides, initial, and final parts of the body loop pass over the photocells. Or as the *h* is shifted, the various parts of the body strokes pass over the electrically paralleled photocells.

Also as the tape is laterally shifted, any leading or trailing strokes in parts 14, 15, 16, 17 of guide 10 pass over their associated photocells 54, 55, 56, 57. As the *e*, for example, is shifted from the FIG. 5 position to the FIG. 8 position, its lower leading stroke passes over photocell 55. As the *h* is shifted, its upper leading and lower trailing strokes actuate photocells 54 and 57.

And finally, as the paper tape 35 is shifted any underlining strokes drawn through dots 18 also pass over electrically paralleled photocells 58*a* and 58*b*. These photocells detect the two ends of the underlining stroke. This spaced detection ensures that a tail stroke inadvertently continued beyond the limit line 13 and down to the center of dots 18 will not be read erroneously as an underlining stroke. As mentioned previously, the numerals and some symbols use the underlining stroke. The detection of the horizontal underlining stroke is of course similar to the detection of the horizontal leading and trailing strokes.

The six circuits of photocells 51 and 54–58 thus produce a six-bit code when the tape 35 is laterally shifted. As shown in FIGS. 9 and 10, the latter code is added to the two-bit code previously stored in memory 62, thereby producing the unique eight-bit code for the character in the scanner. For instance, when the *e* was advanced, the two-bit code 00 (no head or tail strokes) was stored in the memory. And when the *e* was shifted, the body code 1 was generated, as were the leading and trailing stroke codes, 0100, and underlining code, 0. Properly added to the first code, the latter six-bit code forms the memory code 1/00/0100/0, or 10001000. This code, which means the character has a body stroke, no head or tail stroke or upper leading stroke, a lower leading stroke, and no other strokes, uniquely defines the *e*. (The order in which the strokes are arranged to form the code is of course arbitrary and can be changed, so long as the selected order is used consistently.)

As shown in FIGS. 9 and 10, the program controller 50, which was restarted by the abrupt tape-stop signal from photocell 59, sends a read-out signal to a code converter 76, after the eight bits are loaded into memory 62. As mentioned before, the controller 50 may consist of two cascaded monostable multivibrators. Hence the period of the first multivibrator is made sufficient to allow the shift mechanism 66 to operate and the six bits to be loaded into the memory. The trailing edge of this multivibrator then provides the read-out signal, which enables code converter 76 to decode the eight-bit code stored in memory 62 and to re-encode it into the desired machine code. The machine code is applied to the utilizing machine, such as printer 78. As shown in FIGS. 9 and 10, the period of the read-out signal (second multivibrator) is such as to allow time for the code converter 76 to operate and the printer 78 to print the machine code, after which the multivibrator's trailing edge produces the recycle signal, thereby completing the machine cycle.

When the machine reads a skip symbol (see FIG. 2) instructing the printer 78 to tabulate (skip columns) or a release symbol instructing it to release a card and feed a new one, the code converter 76 sends the appropriate signals to the printer and also sends a skip or release delay signal (FIG. 9) to the program controller 50, in order to delay the controller's next read-out signal until it receives an end of skip or release signal from the printer. The skip or release delay signal may, for example, trigger a third monostable multivibrator (not shown) of long delay whose output is connected in parallel with the output of the first multivibrator, so as to override the latter output. The end of skip or release signal from the printer 78 turns off the third multivibrator, thereby cutting short its delay, and producing the next read-out signal at the desired time. In this way, the time between the stop-tape signal and the read-out signal (FIG. 10), during which the tape shifts and the six bits are loaded into the memory 62, may be expanded to accommodate the printer 78.

In summary, the operation of the machine of FIGS. 5–10 is as follows. At the start of a cycle, paper tape 35 is stopped in scanner 40 with a guide 10 positioned in window 63 as shown in FIG. 5. The tape-stop line 39 of the guide 10 is under slit 65, blocking light 44 from photocell 59. Program controller 50 initiates the cycle by applying a signal to clear memory 62 and recycle tape advance mechanism 42. Upon receipt of the recycle signal, the bistable multivibrator in the advance mechanism engages the clutch between the drive motor and tape rollers, releases the brake on the tape rollers, and enables photocells 52, 53. Paper tape 35 then advances, causing any head or tail strokes formed in the following guide 10— now entering window 63 from right to left—to momentarily block the light 44 from photocells 52 and 53. The resultant signals are stored as a two-bit code in memory 62. When the guide 10 is fully advanced into the window 63, the stop-tape line 39 of the guide blocks light 44 from photocell 59, producing a signal to stop tape advance mechanism 42 and restart the waiting program controller 50. In the tape advance mechanism, the bistable multivibrator releases the clutch, applies the brake, disables photocells 52, 53, enables photocells 51, 54–58, and enables tape lateral shift mechanism 66. When enabled, mechanism 66 shifts paper tape 35 from the FIG. 5 position to the FIG. 8 position and back. This causes any body strokes and any upper leading, lower leading, upper trailing, lower trailing, and underlining strokes in the guide to block light 44 from photocells 51 and 54–58, respectively. The resultant six-bit code is loaded into memory 62. Program controller 50 then applies a read-out signal to code converter 76, which converts the eight-bit code in memory 62 to a machine code, sent to printer 78. After time for the converter and printer to operate, program controller 50 puts out another recycle signal, to repeat the proceeding steps. When the machine detects a skip or release symbol, it proceeds to advance and shift the tape and thereby generate the next eight-bit code, but the read-out signal is held up until the printer is ready to accept another input. By proceeding to the read-out point during the printer delay time, the machine operates with minimum delay.

We claim:

1. A machine for reading cursive alphanumeric characters handwritten on a paper tape within preprinted guides serially printed on said tape, said guides positioning the body strokes, head strokes, tail strokes, upper and lower leading strokes, upper and lower trailing strokes, and underlining strokes of said characters, said machine comprising:

means for scanning said preprinted guides in sequence, said scanning means producing for each guide an eight-bit code that corresponds to those of said strokes in said guide, said scanning means comprising:

a planar array of photocells, means for advancing said tape over said array of photocells, means for illuminating the tape passing over said array of photocells, two of said photocells in said array producing a two-bit code when the head stroke and tail stroke parts of a preprinted guide are advanced thereover, an eight-bit memory for storing said two-bit code, a third photocell in said array producing a signal that stops the advancing of the tape over said array after said two-bit code is produced, means for laterally shifting said tape over said array after said tape is stopped, at least six additional photocells in said array producing a six-bit code when the body, upper and lower leading, upper and lower trailing, and underlining stroke parts of said preprinted guide are laterally shifted thereover, said six-bit code being added to said eight-bit memory, whereby said memory provides said eight-bit code, and means for converting each of said eight-bit codes to a machine code.

2. A machine as set forth in claim 1, wherein said array has eight photocells for generating said six-bit code, two of said eight photocells being spaced apart and connected in parallel to detect said body strokes in said preprinted guides, and another two of said eight photocells being spaced apart and connected in parallel to detect said underlining strokes in said preprinted guides.

* * * * *